Jan. 14, 1958 — D. B. McILVIN — 2,819,465
ARTICLE HANDLING MECHANISMS
Filed Sept. 16, 1955 — 4 Sheets-Sheet 2

Inventor
Donald B. McIlvin
By his Attorney

Inventor
Donald B. McIlvin
By his Attorney

Jan. 14, 1958
D. B. McILVIN
2,819,465
ARTICLE HANDLING MECHANISMS
Filed Sept. 16, 1955
4 Sheets-Sheet 4
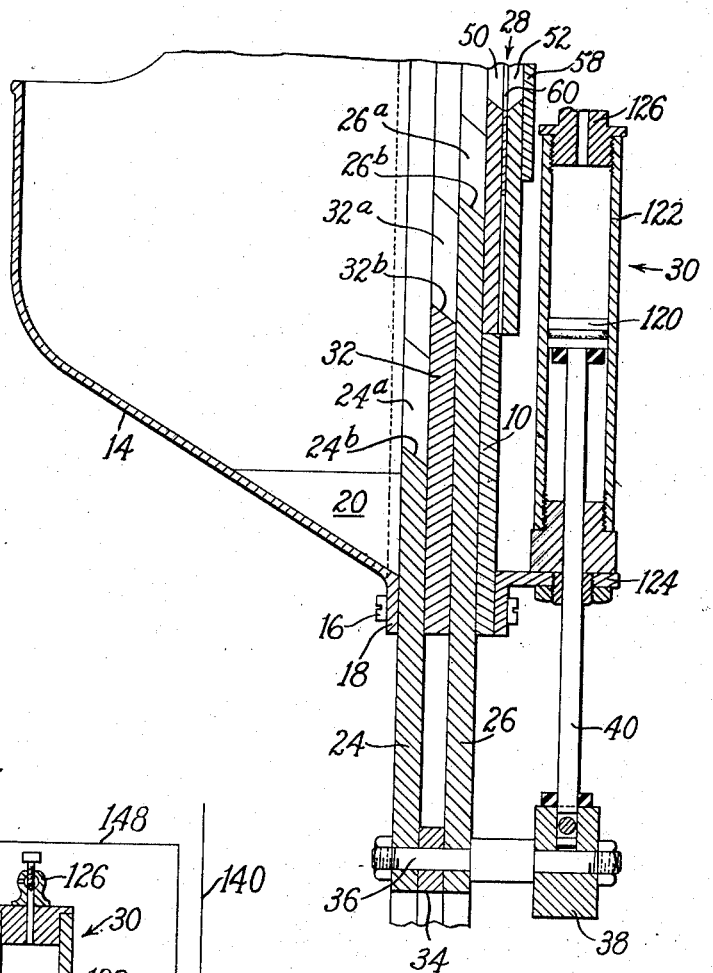
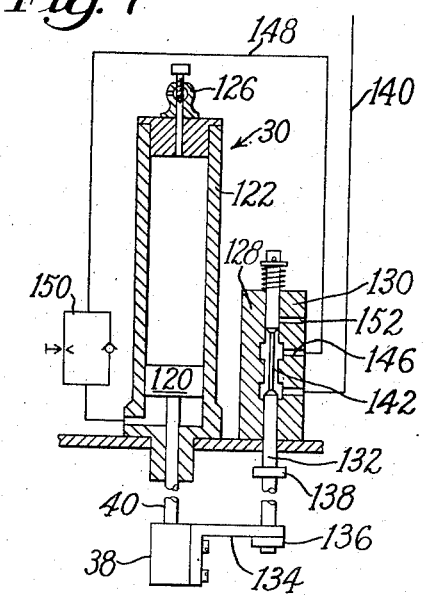
Inventor
Donald B. McIlvin
By his Attorney United States Patent Office 2,819,465
Patented Jan. 14, 1958

2,819,465
ARTICLE HANDLING MECHANISMS

Donald B. McIlvin, Danvers, Mass., assignor to United Shoe Machinery Corporation, Flemington, N. J., a corporation of New Jersey Application September 16, 1955, Serial No. 534,833

12 Claims. (Cl. 1—6)

This invention relates to article handling and more particularly to mechanisms for transferring fasteners from a supply source in which they are randomly arranged to a raceway or a delivery track wherein they are oriented in alined relation to each other.

There is presently a particular need for fast acting and dependable means for uniformly orienting and delivering fasteners, such as nails or screws, with their heads and shanks in alined relation to a raceway or delivery track for supplying inserting devices. Newly developed inserting devices, such as pneumatic nail and screw drivers, require fasteners to be fed continuously in alined relation, and are capable of operation at very high speeds, often the maximum speed being greater than an operator is capable of fully utilizing; consequently, any means permitting an operator to devote his full attention to the operation of the inserting device, without interruptions such as those occasioned by improper feeding or the need for frequent replenishment of the supply of fasteners, results in increased production. It follows that mechanisms for uniformly orienting and delivering the fasteners from a supply in which they are randomly oriented should have a large supply capacity requiring infrequent replenishment and should be capable of delivering the fasteners at a rate equal to or in excess of the maximum speed that the inserting devices utilize them, while operating with a high degree of reliability requiring a minimum amount of attention on the part of the operator. Accordingly, it is an object of this invention to provide an article handling mechanism for delivering fasteners from a supply source of large capacity to a raceway in uniformly oriented relation at a rapid rate and requiring a minimum amount of attention from an operator.

It is not uncommon to employ more than one type of inserting device on the same job, as, for example, in the manufacture of upholstered furniture, where both nails and screws of different sizes are inserted in a single work piece. In instances when it is not necessary for all of the inserting devices to be operated at the same time, it is more economical to employ a single fastener orienting mechanism which is adjustable to handle more than one type and size of fastener. Accordingly, it is another object of this invention to provide an improved fastener orienting mechanism for alining and delivering fasteners of more than one size and type.

To these ends, and in accordance with various features of the invention, there is provided an improved article handling device similar to that disclosed in my copending application for Letters Patent of the United States, Serial No. 427,021, filed May 3, 1954, the present application being a continuation-in-part of subject-matter disclosed therein. There is provided a supply hopper capable of holding a large quantity of randomly arranged fasteners, such as nails or screws, one side of the hopper comprising an elevating mechanism for lifting the fasteners from the hopper to a downwardly extending delivery track or raceway arranged above and to one side of the hopper and leading to a discharge point, from which point the fasteners are conveyed to an inserting device or gun, the hopper being so constructed as to permit the fasteners, particularly at a time when the hopper is nearly empty, to move under the force of gravity toward the side where the elevating mechanism is located. The elevating mechanism comprises a plurality of reciprocating slides movable in parallel planes and having lifting surfaces to transfer fasteners progressively from the hopper to a plurality of stationary fastener receiving surfaces, at least one of which is formed on a stationary plate separating the slides. The stationary fastener receiving surfaces are spaced one above the other and separated in a horizontal direction by the movable plates, the uppermost stationary receiving surface being a portion of the delivery track or raceway and the lowest the hopper bottom. The thickness of the fastener engaging surfaces, both stationary and movable, approximates the diameter of the largest fastener to be handled, but is less than the length of the smallest fastener, whereby only fasteners which are alined with their axes parallel to the planes in which the lift slides reciprocate will be lifted from the hopper. The lifting surfaces and the receiving surfaces are beveled at certain areas to facilitate retention of fasteners. Contiguous with the uppermost receiving surface is provided means, associated with the raceway, for orienting headed fasteners with respect to their ends before they pass to a discharge point at the lower end of the raceway, whereby each fastener will eventually pass from the discharge point with its headed portion uppermost and its shank depending therefrom. The raceway or delivery track, including the means for orienting the fasteners, is adjustable widthwise to accommodate the heads and shanks of fasteners of different sizes, shapes, and types. To assure that no fastener is discharged in an improperly oriented manner a rejector is provided in the form of a rotating member in advance of the discharge point and is so arranged that it directs any improperly oriented fastener away from the discharge point while permitting those which are properly oriented to pass.

By employing a plurality of movable plates, the distance each must travel is short, permitting a large number of transfer motions to be made each minute without exceeding a deceleration of 32.2 feet per second per second at the top of their upward travel. This limit of deceleration is critical, since above 32.2 the fasteners would be thrown about and not efficiently transferred to the delivery track or raceway.

To assure proper orientation of the fasteners in the downwardly extending delivery track or raceway, it is desirable that they be transferred to the raceway at a point somewhat above the orienting means. To accomplish this, certain of the plates, both movable and stationary, have their fastener engaging surfaces beveled in one direction to retain fasteners to deliver them in a desirable location, and beveled in the opposite direction to return fasteners to the hopper that would normally be delivered in an undesirable location.

Addiitonally, to assure that no fasteners reach the discharge point which are not properly alined and oriented, there is provided a stationary plate adjacent the rotary rejector and having a beveled surface inclined away from the raceway and toward the hopper. With this latter construction, any improperly oriented fasteners approaching the discharge point are rejected from the raceway and pass down the last-mentioned beveled surface back into the hopper.

A single power source is employed to reciprocate linearly the lift slides and to rotate the rejector. The two mechanisms are operatively connected by a flexible, disengageable, power-transmitting means in order that the rejector may be stopped manually to clear any inadvertent clogging of the raceway without having to discontinue the operation of the lift slides. A further advantage of the flexible power transmitter is that it eliminates the necessity of gears which are more expensive to manufacture and maintain.

The above and other features of the invention, including various novel details of construction and combinations of parts, will now be more particularly described with reference to the accompanying drawings and pointed out in the claims.

In the drawings,

Fig. 6 is a section taken along the line VI—VI in Fig. 1; and

Fig. 7 is a diagrammatic showing of an air motor for operating the article handling mechanism shown in Fig. 1.

Figure 1:
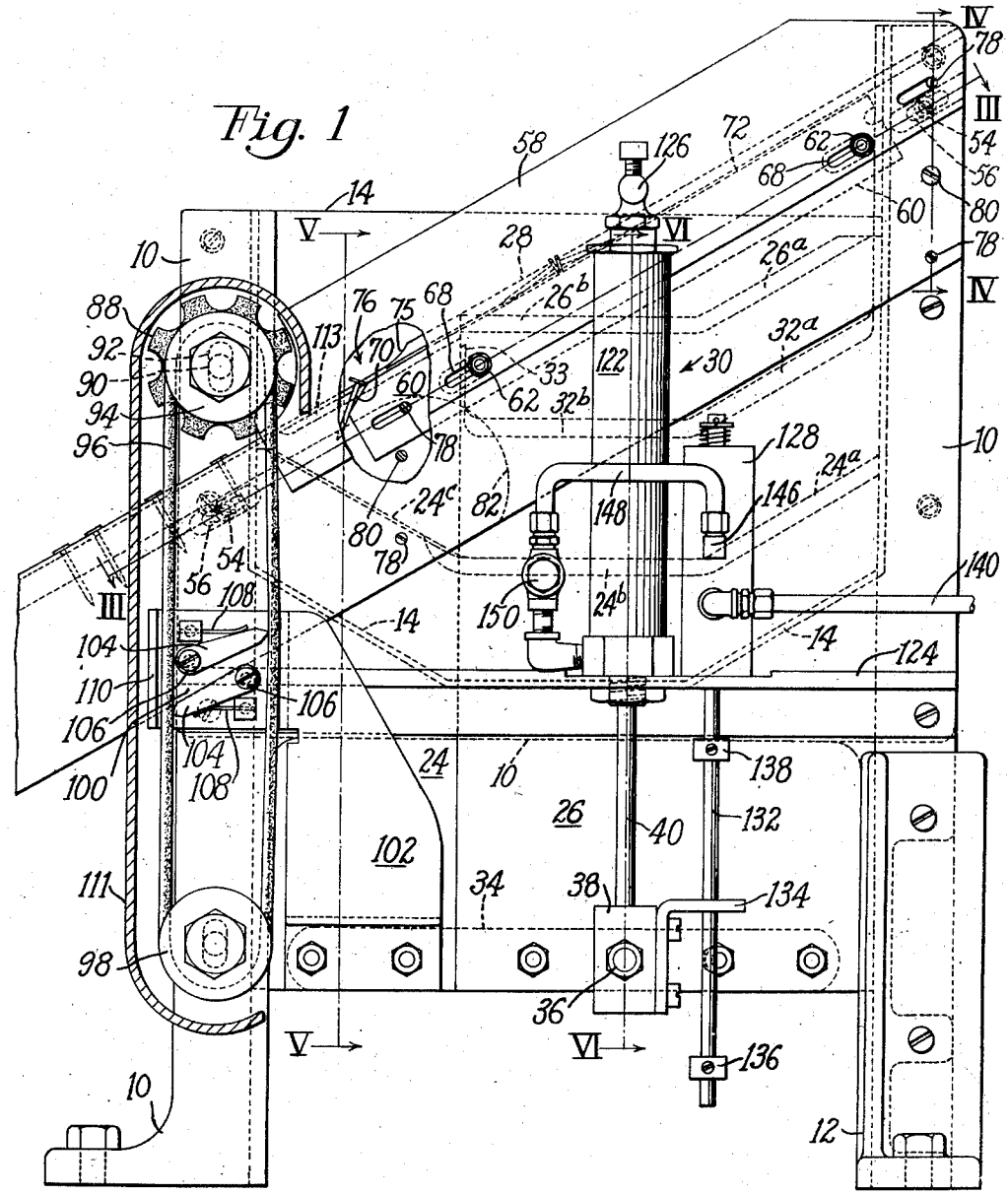
Fig. 1 is a side elevation, partly broken away, of an article handling mechanism embodying the invention.

The transfer mechanism comprises a main frame 10 having the general configuration of the letter H (Fig. 1) secured in an upright position to a bench or other suitable support by one or more brackets 12. A large capacity, three-sided hopper 14 of sheet metal or plastic is secured to the frame by screws 16 passing through a flange 18. The bottom of the hopper slopes downwardly toward the open side which faces the frame. The corners of the hopper adjacent the open side slope downwardly and inwardly, as shown at 20 and 22. The construction of the hopper is such that fasteners, such as nails or screws, will move under the force of gravity in the direction of the arrows in Fig. 2 toward the bottom center of the open side, particularly when the hopper is nearly empty, in order that all fasteners in the hopper will be utilized. Slidably mounted in the frame, and forming the fourth side of the hopper, is a pair of lift slides 24 and 26 to transfer fasteners from the hopper progressively upward to a downward sloping raceway 28. The lift slides are reciprocated in parallel vertical planes by means of an air motor 30, the slide 24 delivering fasteners to a stationary receiving plate 32 and the slide 26 receiving the fasteners from the plate 32 and delivering them to the raceway.

Figure 2:
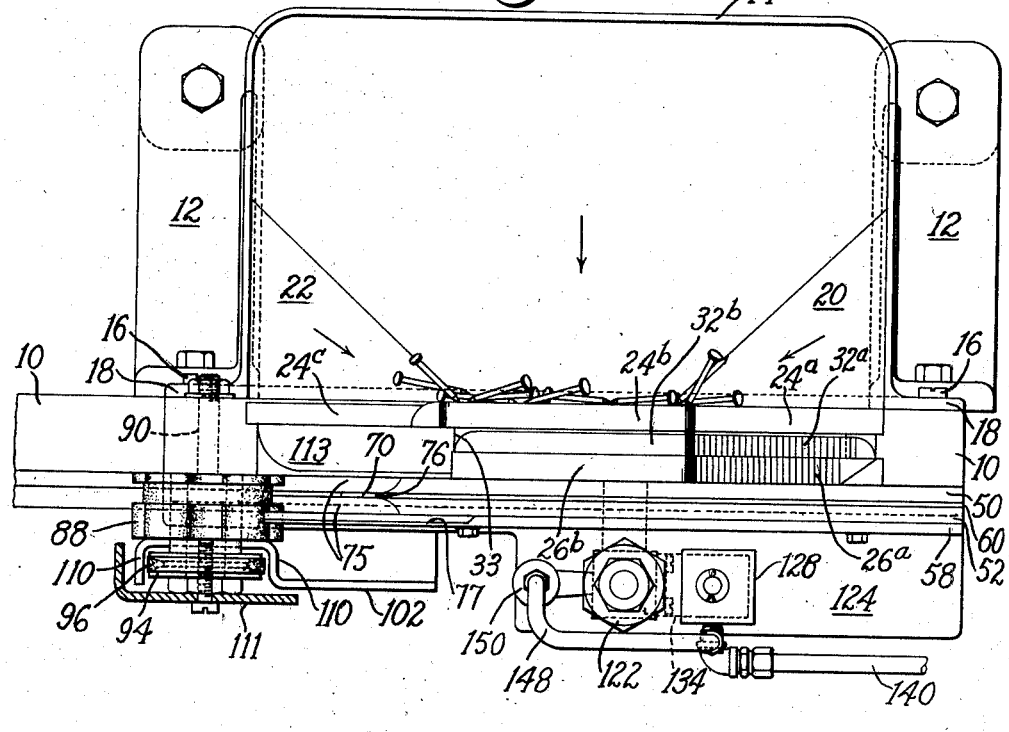
Fig. 2 is a plan view of the mechanism shown in Fig. 1.
Figure 5:
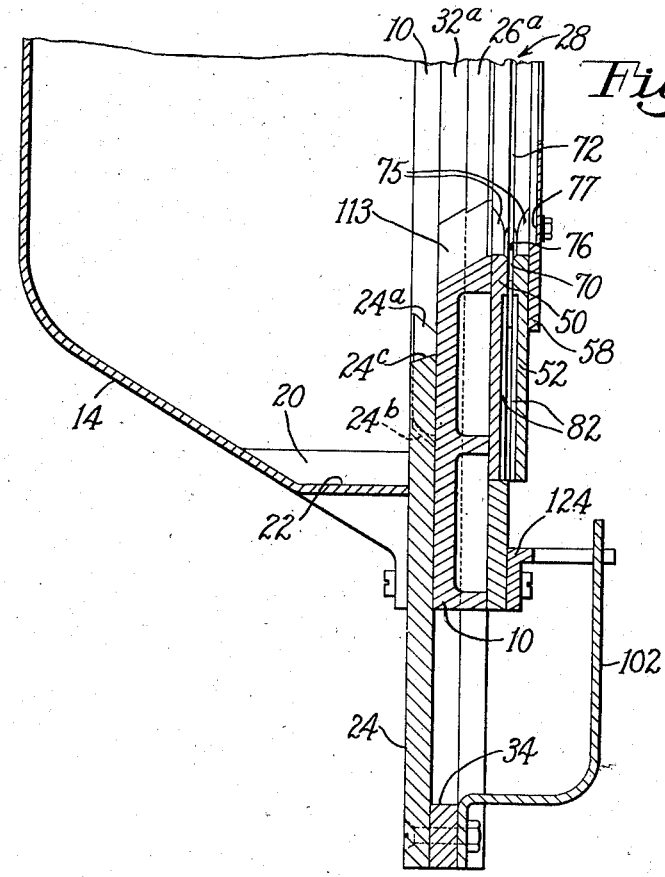
Fig. 5 is a section taken along the line V—V in Fig. 1.

The lift slide 24 has three fastener engaging surfaces, the first being the surface 24a which slopes downwardly toward the bottom center of the open side of the hopper, as seen in Fig. 1, and is beveled away from the hopper, as seen in Fig. 6, the second being surface 24b which is horizontal, as seen in Fig. 1, and beveled away from the hopper, as seen in Fig. 6, the third being 24c, which slopes downwardly toward the bottom center of the open side of the hopper at an angle with the surface 24a, as seen in Fig. 1, and which is slightly beveled toward the hopper, as seen in Fig. 5. The second lift slide, 26, has two fastener engaging surfaces, the first being 26a which is parallel to and above the surface 24a, and 26b which is parallel to and above the surface 24b. Separating the lift slides 24 and 26 is the stationary fastener receiving plate 32 which has two fastener receiving surfaces 32a and 32b parallel to the surfaces 24a and 24b respectively and terminates in a vertical wall 33. The lower ends of the lift slides 24 and 26 are separated by a spacer bar 34 which is approximately the same thickness as the plate 32. Passing through the lift slides and the spacer bar 34 is a bolt 36 (Fig. 6) secured in a block 38 to which is attached a piston rod 40 extending from the air motor 30. The thickness of each lift slide 24 and 26 and of the stationary plate 32 is slightly greater than the diameter of the head of the largest fastener to be handled and less than the length of the smallest fastener, so that as the lift slides are reciprocated they will retain fasteners with axes alined parallel to the planes of movement of the lift slides and will reject others not so oriented. The length of travel of the slides is such that when they are in the lowest position the upper edge of surface 24b will be just below the edge of the lowest part of the open side of the hopper and when they are in their highest position, the lower edge of surface 26a will be just above the edge of the raceway.

Because all the surfaces except 24c are beveled away from the hopper, the fasteners will be retained thereon in contact with the adjacent plate or slide during the course of their upward travel. For example, one or more fasteners will pass from the hopper onto the surface 24b with their axes generally parallel to the path of movement of the lift slide 24, and upon upward movement of the slide will be carried therewith and pass onto the surface 32b of the stationary plate from which they will pass onto the surface 26b during the next cycle of movement and thence onto the raceway 28 which forms the uppermost fastener receiving surface. Because the surface 24c is sloped downwardly toward the center of the bottom of the open side of the hopper and because it is beveled toward the hopper rather than away from it as are the other fastener engaging surfaces, fasteners will not be retained thereon but instead will be rejected and at times directed toward the fastener retaining surfaces. When the hopper is comparatively full, as for example when filled to a point just below the surface 32b (Fig. 1), the surface 24c will only reject the fasteners in the hopper, but when the hopper is less full, as for example when filled to a point adjacent the surface 24b in the position shown in Fig. 1, the surface 24c will not only reject fasteners but its downwardly inclined slope will direct the fasteners toward the surfaces 24b and 24a. Another function of the surface 24c will be seen hereinafter.

Figure 3:
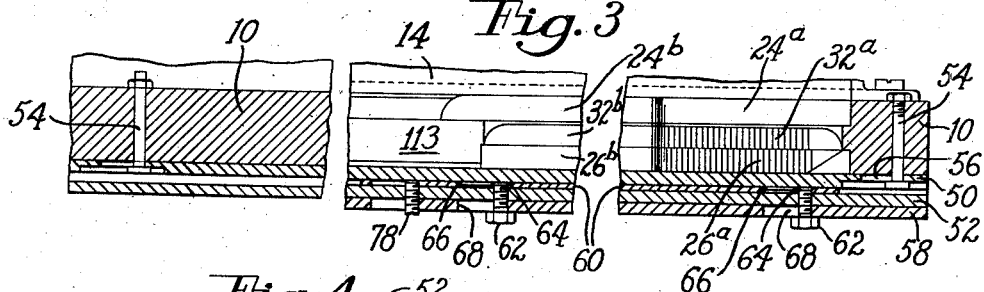
Fig. 3 is a section taken along the line III—III in Fig. 1 and showing a raceway to which fasteners are delivered.
Figure 4:
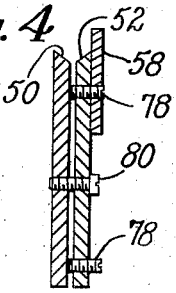
Fig. 4 is a section taken along the line IV—IV in Fig. 1.

The raceway 28 comprises a pair of plates 50 and 52, a portion of the upper surfaces thereof being beveled to form a V-shaped groove, as seen in Fig. 6, into which the fasteners are delivered from the lift slide 26, the bottom of said groove being parallel to the surfaces 24a, 26a and 32a. Referring to Fig. 3, the plate 50 is secured to the frame 10 by means of bolts 54 which pass through elongated recessed slots 56 whereby the plate 50 may be adjusted lengthwise of the frame by selectively locating it relative thereto. The plate 52 has secured to its outer surface, i. e., the surface remote from the hopper, a guard 58 which prevents fasteners from inadvertently leaving the raceway. Adjacent the inner surface of the plate 52 is a guide plate 60. The plate 52, the guard 58 and the guide plate 60 are held together by means of bolts 62. The countersunk heads 64 of these bolts fit within elongated recesses 66 in the guide plate 60 and the guard 58 is provided with similar elongated slots 68 whereby both the guide plate 60 and the guard 58 may be adjusted longitudinally of the raceway plate 52. The guide plate 60 is of shorter length than the raceway terminating in a guiding surface or sloped area 70 toward the lower end of the raceway. The upper surface 72 of the guide plate is flat and lies at the bottom of the V formed by the beveled surfaces of the raceway plates 50 and 52. Just in advance of the guiding surface 70 the upper surface of the raceway plates level off, as seen at 75 in Fig. 5, the raceway gradually assuming a flat configuration. The surfaces 70 and 75 form a fastener orienting area designated as 76. Adjacent this area the guard 58 is relieved, as seen at 77. The raceway plate 52, the guard 58, and the guide plate 60, which, as mentioned above, are secured together as a unit, are adjustable toward and away from the raceway plate 50 by means of a plurality of setscrews 78 which are threaded in the plate 52 and bear against the adjacent surface of the plate 50. A plurality of lock screws 80 are threaded in the plate 50. To adjust the width of the spacing between the raceway plates 50 and 52 the lock screws 80 are backed off and the setscrews 78 advanced until the proper spacing is obtained, thereupon the lock screws 80 are tightened. The purpose of this widthwise adjustment is to accommodate uniformly the heads and shanks of various size fasteners whereby they may pass down the raceway without overlapping. The facing surfaces of the raceway plates 50 and 52 are relieved slightly, as seen at 82 in Figs. 1 and 5, the purpose being to accommodate any forging flash which might be formed on the pointed end of a nail.

The manner in which the orienting area 76 uniformly alines the fasteners will now be described. As stated above, fasteners are delivered to the raceway from the surfaces 26a and 26b of the upwardly moving lift slide 26. They pass down the raceway with either their pointed or headed ends foremost. The pointed end of each fastener rides along the upper surface 72 of the guide plate 60, its head fitting in the V formed by the raceway plates, the raceway previously having been adjusted widthwise to accommodate the size of the fasteners being handled. When the point reaches the sloped area 70 of the guide plate 60 it moves downwardly between the raceway plates finally severing contact with the guide plate. The head of the fastener in the meantime has moved onto the tapering upper surfaces 75 of the raceway and upon further downward movement passes down the raceway to the discharge point located at the lower end suspended by its head. It makes no difference whether fasteners initially pass down the raceway head or point foremost, since all fasteners will be uniformly alined point downwardly by the sloped area 70 of the guide plate.

In order that no fastener passes down the raceway in other than uniformly alined relationship, point downwardly, there is provided a rejector wheel 88 which is rotated in a counterclockwise direction, as seen in Fig. 1, to return to the hopper any fastener not so oriented. The rejector 88 may be a bristled wheel or a solid resilient wheel the periphery of which just clears the head of a fastener properly oriented in the raceway. The rejector wheel is mounted on a stud 90 which passes through an elongated slot 92 in the frame so as to be adjusted heightwise of the raceway. Passing around a pulley 94 on the stud 90 is a continuous flexible belt 96 which also passes around a pulley 98 journaled in the lower end of the frame. Motion is imparted to the belt 96 by means of a pawl clutch 100 which is mounted on a bracket 102 secured to the lower end of the spacer bar 34 and the lift slide 24 (Fig. 5). The pawl clutch 100 comprises a pair of pawls 104 pivoted on studs 106 and biased toward each other by means of leaf springs 108. The free end of each of the pawls is pointed and contacts the belt 96, the pawls being longer than the radius of the pulleys 94 and 98. As the clutch moves upwardly with the lift slides, the point of the upper pawl bites into the belt 96, the point of the lower pawl sliding along the belt, the belt consequently moving in a counterclockwise direction. On the downstroke the lower pawl bites into the belt, the upper pawl sliding therealong. The belt is prevented from moving outwardly under the action of the pawls by flanges 110 (Fig. 2) of the bracket 102. A guard 111 covers the belt, pulleys and the pawl clutch. Cooperating with the rejector wheel 88 is a fastener rejecting surface 113 (Figs. 2 and 5) formed on the frame adjacent the orienting area 76 of the raceway 28. As seen in Fig. 5, the surface 113 is beveled toward the hopper 14 and any fastener which is rejected from the raceway will slide or roll down said surface into the hopper.

To assure proper orientation of the fasteners it is desirable that they be delivered to the raceway at a point somewhat above the orienting area 76. Consequently, as stated above, the upper surface 24c of the lift slide 24 is beveled toward the hopper to reject fasteners which would otherwise be elevated to the raceway at this area. Should, however, a fastener reach the orienting area without first having passed down the V of the raceway, particularly when the hopper is full, it will be rejected by the sloping surface 113, the surface 24c of the upwardly moving lift slide aiding in this rejection. It will be noted also that the lift slide 26 has only two fastener engaging surfaces, both being remote from the orienting area.

The lift slides are continuously reciprocated by means of the air motor 30 which comprises a piston 120, connected to the rod 40 and slidable within a cylinder 122, the cylinder being mounted on an angle brace 124 on the frame 10. The upper end of the cylinder 122 is vented to atmosphere through a needle valve 126. Also mounted on the angle brace 124 adjacent the cylinder 122 is a control valve 128 which comprises a multi-diameter cylinder 130, having a control valve rod 132 slidable therein, the rod fitting the cylinder snugly enough to remain in any position it may be moved to. Affixed to the block 38 on the lower end of the piston rod 40 is a bracket 134 slidable on the portion of the control valve rod 132 extending from the cylinder 130. Adjustably mounted on the rod 132 is a pair of collars 136 and 138. Compressed air is admitted to the valve through a line 140 and passes a necked area 142 of the rod 132, which area is normally adjacent a port 146 communicating with a line 148 leading to the lower end of the cylinder 122. Interposed in the line 148 is a one-way restricted flow valve 150, permitting a free flow of compressed air toward the cylinder and a restricted flow therefrom. As air is admitted to the lower portion of the cylinder 122 the piston 120 is forced upwardly which causes the lift slides to move upwardly and the rejector wheel 88 to rotate. The air above the piston escapes through the needle valve 126. Upon reaching the upper end of its stroke, the bracket 134 abuts the collar 138, moving the control valve rod 132 into an upper position sealing off the line 140 from the line 148 and exposing a vent 152. Thereupon, the air is no longer admitted to the line 148 and the lower portion of the cylinder 122 and the piston 120 and the lift slides are free to fall by gravity, the air below the piston escaping slowly through the restricted flow valve 150 and passing back through line 148, thence to atmosphere through the vent 152. When the piston reaches the lower end of its stroke, the bracket 134 abuts the collar 136, moving the control valve rod 132 to a lower position, sealing off the vent 152, and again placing the lines 140 and 148 in communication, thus repeating the cycle. The speed of reciprocation of the lift slides is varied by adjusting the needle valve 126 and the restricted flow valve 150. The length of travel of the slides is varied by adjusting the positions of the collars 136 and 138 on the rod 132.

While the lift slides are thus continuously reciprocated to deliver fasteners to the upper end of the raceway, the rejector wheel 88 may be stopped manually without stopping the lift slides either by permitting the belt 96 to slide over the pulley 94 or removing it therefrom. Furthermore, the speed of rotation of the wheel 88 may be momentarily increased, by either spinning the wheel or moving the belt 96 manually. This is done in order that any excessive collecting of fasteners in the orienting area may be eliminated without causing the delivery of fasteners to be interrupted.

Having thus described my invention, what I claim as new and desire to secure by Letters Patent of the United States is:

1. In an apparatus for delivering headed fasteners and other elongated articles, a supply hopper, a downwardly extending raceway spaced above and to one side of the hopper and having fastener orienting means located near its lower end, an elevating mechanism for transferring fasteners from the hopper to the raceway comprising a plurality of lift slides mounted for reciprocating motion to deliver fasteners progressively from the hopper bottom to the raceway, all of said slides having fastener retaining surfaces coextensive lengthwise with portions of the raceway remote from said fastener orienting means and at least one of said slides having a fastener rejecting surface coextensive lengthwise with said orienting means whereby fasteners will be delivered to said raceway only at portions thereof remote from said fastener orienting means.

2. In an apparatus for delivering headed fasteners and other elongated articles, a supply hopper, a downwardly extending raceway spaced above and to one side of the hopper, an elevating mechanism for transferring fasteners from the hopper of the raceway comprising a plurality of lift slides mounted for reciprocating motion to deliver fasteners progressively from the hopper bottom to the raceway, at least one lift slide having a plurality of fastener engaging surfaces, one of which is formed to retain fasteners thereon during the transfer motion and a second surface formed to reject fasteners and direct them toward the retaining surface whereby fasteners will be delivered to the raceway only in the area adjacent the surface formed to retain fasteners.

3. In an apparatus for delivering fasteners and other elongated articles uniformly oriented with respect to their ends, a supply hopper, a downwardly extending raceway spaced above and to one side of the hopper and having fastener orienting means located near its lower end, an elevating mechanism for transferring fasteners progressively from the hopper to upper portions of the raceway remote from the orienting means comprising a plurality of lift slides mounted for reciprocating motion, all of said slides having fastener retaining surfaces coextensive lengthwise vertically with portions of the raceway remote from said fastener orienting means and at least one of said slides having a fastener rejecting surface coextensive lengthwise with said orienting means and formed to direct fasteners away therefrom.

4. In an apparatus for delivering fasteners and other elongated articles uniformly oriented with respect to their ends, a supply hopper, a downwardly extending raceway spaced above and to one side of the hopper and having fastener orienting means located near its lower end, an elevating mechanism for transferring fasteners progressively from the hopper to upper portions of the raceway remote from the orienting means comprising a plurality of lift slides mounted for reciprocating motion, all of said slides having fastener retaining surfaces coextensive lengthwise vertically with portions of the raceway remote from said fastener orienting means and at least one of said slides having a fastener rejecting surface coextensive lengthwise with said orienting means and formed to direct fasteners away therefrom, and means for rejecting from the raceway and returning to the hopper fasteners which have not been uniformly oriented with respect to their ends.

5. In an apparatus for delivering fasteners and other elongated articles uniformly oriented with respect to their ends, a supply hopper, a downwardly extending raceway spaced above and to one side of the hopper and having fastener orienting means located near its lower end, an elevating mechanism for transferring fasteners progressively from the hopper to upper portions of the raceway remote from the orienting means comprising a plurality of lift slides mounted for reciprocating motion, all of said slides having fastener retaining surfaces coextensive lengthwise with portions of the raceway remote from said fastener orienting means and at least one of said slides having a fastener rejecting surface coextensive lengthwise with said orienting means and formed to direct fasteners away therefrom, means for rejecting from the raceway and returning to the hopper fasteners which have not been uniformly oriented with respect to their ends comprising a rejector wheel mounted for rotation adjacent the orienting means and spaced above the raceway an amount sufficient to permit only uniformly oriented fasteners to pass down the raceway from said orienting means and a beveled surface adjacent said rejector wheel to direct rejected fasteners to the hopper.

6. In an apparatus for delivering fasteners and other elongated articles uniformly oriented with respect to their ends, a supply hopper, a downwardly extending raceway spaced above and to one side of the hopper and having fastener orienting means located near its lower end, an elevating mechanism for transferring fasteners progressively from the hopper to upper portions of the raceway remote from the orienting means comprising a plurality of lift slides mounted for reciprocating motion, means for rejecting from the raceway and returning to the hopper fasteners which have not been uniformly oriented with respect to their ends comprising a rejector wheel mounted for rotation adjacent the orienting means and spaced above the raceway an amount sufficient to permit only uniformly oriented fasteners to pass down the raceway from said orienting means and a beveled surface adjacent said rejector wheel to direct rejected fasteners to the hopper, a continuously operating fluid motor connected to said lift slides to impart reciprocating motion thereto, a continuous flexible belt for driving said rejector wheel, a clutch connected to said fluid motor to impart substantially continuous movement to said flexible belt, said clutch comprising a pair of gripping pawls arranged to impart motion to different areas of the flexible belt intermittently in opposite directions whereby said rejector wheel is continuously rotated as the lift slides are reciprocated.

7. In an apparatus for delivering headed fasteners and other elongated articles uniformly oriented with respect to their ends, a downwardly inclined raceway having upper and lower parts, the upper part including a pair of supporting members arranged to form a V-shaped delivery track for supporting both the heads and shanks of fasteners, the lower part being a slotted delivery track contiguous with the upper part and arranged to support fasteners by their heads with their shanks depending therefrom parallel to each other as they move down said second part, a hopper for holding a randomly oriented supply of fasteners located below and adjacent one side of both the upper and lower parts of the raceway, and means to deliver fasteners to the raceway comprising a plurality of lift slides mounted for reciprocating motion between the hopper and the raceway and formed to deliver fasteners to the upper part of the raceway only.

8. In an apparatus for delivering headed fasteners and other elongated articles uniformly oriented with respect to their ends, a downwardly inclined raceway having upper and lower parts, the upper part including a pair of supporting members arranged to form a V-shaped delivery track for supporting both the heads and shanks of fasteners, the lower part being a slotted delivery track contiguous with the upper part and arranged to support fasteners by their heads with their shanks depending therefrom parallel to each other as they move down said second part, a hopper for holding a randomly oriented supply of fasteners located below and adjacent one side of both the upper and lower parts of the raceway, means to deliver fasteners to the raceway comprising a plurality of lift slides mounted for reciprocating motion between the hopper and the raceway and formed to deliver fasteners to the upper part of the raceway only, means for rejecting from the lower part of the raceway and returning to the hopper fasteners which are not uniformly oriented with respect to their ends comprising a rejector wheel mounted above the lower part of the raceway an amount greater than the thickness of the fastener heads to permit only uniformly oriented fasteners to pass.

9. In an apparatus for delivering headed fasteners and other elongated articles uniformly oriented with respect to their ends, a downwardly inclined raceway having upper and lower parts, the upper part having a pair of supporting members arranged to form a V-shaped delivery track for supporting both the heads and shanks of fasteners, the lower part being a slotted delivery track contiguous with the upper part and arranged to support fasteners by their heads with their shanks depending therefrom parallel to each other as they move down said lower part, a hopper for holding a randomly oriented supply of fasteners located below and adjacent the sides of both the upper and lower parts of the raceway, means to delivery fasteners to the raceway comprising a plurality of lift slides mounted for reciprocating motion between the hopper and the raceway, all of said lift slides having fastener retaining surfaces coextensive lengthwise with the upper part of said raceway and at least one of said slides having a fastener rejecting surface coextensive lengthwise with said lower part of the raceway and formed to direct fasteners toward said fastener retaining surfaces whereby the fasteners are elevated from the hopper and delivered to the upper part of the raceway only.

10. In an apparatus for delivering headed fasteners and other elongated articles uniformly oriented with respect to their ends, a downwardly inclined raceway having upper and lower parts, the upper part having a pair of supporting members arranged to form a V-shaped delivery track, a guide plate interposed between said supporting members and having a fastener engaging surface forming the bottom of the V-shaped delivery track whereby the heads of fasteners are supported by said supporting members and the shanks are supported by said guide plate, the lower part of said raceway being a slotted delivery track contiguous with the upper part and arranged to support fasteners by their heads with their shanks depending therefrom parallel to each other as they move down said lower part, said guide plate terminating in a beveled camming surface in the area where the upper and lower parts of the raceway join, whereby the shanks of the fasteners as they move from said upper to said lower part will be directed between the supporting members while the fasteners are supported by their heads, a hopper for holding a randomly oriented supply of fasteners located below and adjacent one side of both the upper and lower parts of the raceway, and means to deliver fasteners to the raceway comprising a plurality of lift slides mounted for reciprocating motion between the hopper and the raceway and formed to deliver fasteners to the upper part of the raceway only.

11. In an apparatus for delivering headed fasteners and other elongated articles uniformly oriented with respect to their ends, a downwardly inclined raceway having upper and lower parts, the upper part having a pair of supporting members arranged to form a V-shaped delivery track, a guide plate interposed between said supporting members and having a fastener engaging surface forming the bottom of the V-shaped delivery track, whereby the heads of fasteners are supported by said supporting members and the shanks are supported by said guide plate, said supporting members being spaced from each other at the lower part of said raceway an amount less than the head of a fastener and greater than the shank thereof to form a slotted delivery track, said guide plate terminating in a beveled camming surface in the area where the upper and lower parts of the raceway join whereby the shanks of the fasteners as they move from said upper to said lower part will be directed between the supporting members while the fasteners are supported by their heads, means to vary the position of the camming surface of the guide plate in a direction lengthwise of the downwardly inclined direction of the raceway, a hopper for holding a randomly oriented supply of fasteners located below and adjacent one side of both the upper and lower parts of the raceway, and means to deliver fasteners to the raceway comprising a plurality of lift slides mounted for reciprocating motion between the hopper and the raceway and formed to delivery fasteners to the upper part of the raceway only.

12. In an apparatus for delivering headed fasteners and other elongated articles uniformly oriented with respect to their ends, a downwardly inclined raceway having upper and lower parts comprising a pair of supporting members arranged to form a V-shaped delivery track at the upper part for supporting both the heads and shanks of fasteners, said supporting members being spaced from each other at the lower part an amount less than the head of a fastener and greater than the shank thereof to form a slotted delivery track whereby fasteners as they move down said second part will be supported by their heads with their shanks depending therefrom parallel to each other, means to vary the width of the slot between said supporting members whereby fasteners of different sizes may be accommodated, a hopper for holding a randomly oriented supply of fasteners located below and adjacent one side of both the upper and lower parts of the raceway, and means to deliver fasteners to the raceway comprising a plurality of lift slides mounted for reciprocating motion between the hopper and the raceway and formed to deliver fasteners to the upper part of the raceway only.

References Cited in the file of this patent

UNITED STATES PATENTS

| | | |
|---|---|---|
| 334,898 | Rogers | Jan. 26, 1886 |
| 488,084 | Miner | Dec. 13, 1892 |
| 935,401 | Petersen | Sept. 28, 1909 |
| 2,186,172 | Molitor | Jan. 9, 1940 |